United States Patent [19]

Tsutsumi et al.

[11] Patent Number: 5,852,074
[45] Date of Patent: Dec. 22, 1998

[54] AQUEOUS INK FOR INKJET PRINTING

[75] Inventors: Takehiro Tsutsumi; Michitaka Sawada, both of Wakayama, Japan

[73] Assignee: Kao Corporation, Tokyo, Japan

[21] Appl. No.: 806,236

[22] Filed: Feb. 24, 1997

[30] Foreign Application Priority Data

Feb. 22, 1996 [JP] Japan .................................. 8-035081
Mar. 6, 1996 [JP] Japan .................................. 8-048498

[51] Int. Cl.$^6$ .................................................. C09D 11/10
[52] U.S. Cl. .......................................................... 523/161
[58] Field of Search .................................... 523/160, 161; 526/279

[56] References Cited

U.S. PATENT DOCUMENTS

| | | | |
|---|---|---|---|
| 4,105,615 | 8/1978 | Balatan et al. | 428/461 |
| 4,246,154 | 1/1981 | Yao | 526/304 |
| 4,471,079 | 9/1984 | Enami | 523/161 |
| 4,692,188 | 9/1987 | Ober et al. | 106/23 |
| 4,963,189 | 10/1990 | Hindagolla | 106/22 |
| 5,281,261 | 1/1994 | Lin | 523/205 |
| 5,470,930 | 11/1995 | Toba | 526/208 |
| 5,506,295 | 4/1996 | Kado | 523/160 |
| 5,661,197 | 8/1997 | Villiger | 523/161 |

FOREIGN PATENT DOCUMENTS

| | | |
|---|---|---|
| 55-18412 | 2/1980 | Japan . |
| 55-139471 | 10/1980 | Japan . |
| 4-28776 | 1/1992 | Japan . |
| 4-189876 | 7/1992 | Japan . |
| 4-261478 | 9/1992 | Japan . |
| 4-359071 | 12/1992 | Japan . |
| 4-359072 | 12/1992 | Japan . |

*Primary Examiner*—Paul R. Michl
*Attorney, Agent, or Firm*—Oblon, Spivak, McClelland, Maier & Neustadt, P.C.

[57] ABSTRACT

An aqueous inkjet printing ink with excellent water resistance, wherein scorching onto a printer head scarcely occurs, the amount of a hydrophobic dye contained in an aqueous dispersion of a vinyl polymer can be increased, and sharp printed letters having deep color can be provided. The aqueous ink product for inkjet printing comprises a dispersion of a vinyl polymer obtained by copolymerizing one or more selected from a silicone macromer, an acrylamide monomer and a methacrylamide monomer (not having a salt-forming group), or a styrene macromer of a styrene homopolymer or a styrene copolymer having a polymerizable functional group at one terminal end, a polymerizable unsaturated monomer having the salt-forming group, and a monomer capable of polymerizing with these monomers in the presence of a radical polymerization initiator, a hydrophobic dye being contained in the dispersion.

11 Claims, No Drawings

AQUEOUS INK FOR INKJET PRINTING

BACKGROUND OF THE INVENTION

1. Field of the Invention

The present invention relates to an aqueous ink for inkjet printing. The present invention further relates to an aqueous ink for inkjet printing which can improve water resistance, prevent scorching onto a printer head, increase the amount of a hydrophobic dye contained in an aqueous dispersion of a vinyl polymer, and provide sharp printed letters having a deep color.

2. Discussion of the Background

An inkjet printing system is a printing system in which ink drops are directly jetted through a very fine nozzle onto a printing material, whereby the ink adheres onto the printing material and letters or images are obtained thereon. A device using such a system not only has advantages such as low noise and good operability, but also other advantages such as easy coloring and the suitability of usual paper as recording paper. For these reasons, the inkjet printing system has widely been used in recent years. As the jet system of the ink in a personal printer, a piezoelectric system has been used utilizing a piezoelectric element for a printer head and a heat jet system utilizing a heater, e.g., a heating resistance element.

In such an inkjet printer, a water-soluble dye and a polyhydric alcohol are usually used in the ink in order to prevent the clogging of the nozzle. When a water-soluble dye is used, the nozzle is scarcely clogged with the ink. However, there is a problem of a poor water resistance. Particularly, when a heat jet system is used, another problem arises: the dye is oxidized by excessive heat on the printer head, so that the ink is easily scorched on the printer head.

To improve the water resistance of the ink for inkjet printing, it has been proposed to use a pigment as the ink (JP-A-4-28776, JP-A-4-189876, JP-A-4-359071, JP-A-4-359072), to use a non-aqueous liquid medium (JP-A-4-261478), and to use a dye which is excellent in water resistance (U.S. Pat. No. 4,963,189).

However, when a pigment is used as the ink, there might be caused a problem that the chroma of printed matters deteriorates, and the problem of nozzle clogging tends to occur. In addition, the improvement is not sufficient.

Furthermore, it has also been suggested to blend a latex so as to improve the water resistance (JP-A-55-18412). However, when the latex is mixed, scorching on the printer head is serious, and nozzle clogging still tends to occur.

Moreover, an ink composition has been suggested in which a dispersion dye is contained in water-insoluble vinyl polymer latex particles (JP-A-55-139471), but in the case of the usual vinyl polymer latex, the amount of the contained dye is small, and storage stability is not sufficient.

SUMMARY OF THE INVENTION

Accordingly, an object of the present invention is to provide an aqueous ink for inkjet printing in which water resistance can be improved, scorching onto a printer head scarcely occurs, the amount of a hydrophobic dye contained in an aqueous dispersion of a vinyl polymer can be increased, and sharp printed letters having a deep color can be provided.

The present inventors have carried out extensive research to solve the above-mentioned problems. As a result, it was found that when a vinyl polymer aqueous dispersion in which a hydrophobic dye is contained in particles is used as an ink base material, the water resistance of the ink can be improved without impairing color development properties of the dye. It was also found that in order to obtain sufficient dye content without impairing the stability of the ink, the vinyl polymer aqueous dispersion having a specific structure is effective. In consequence, the present invention was completed.

The present invention provides an aqueous ink product for inkjet printing which comprises an aqueous dispersion (A) of particles of a vinyl polymer obtained by copolymerizing at least one monomer (a) selected from a silicone macromer (a-1) having the formula (1), an acrylamide monomer (a-2) and a methacrylamide monomer (a-3) not having a salt-forming group, a polymerizable unsaturated monomer (c) having a salt-forming group, and a monomer (d) capable of polymerizing with these monomers in the presence of a radical polymerization initiator (e), a hydrophobic dye (B) being contained in the particles of the aqueous dispersion (A):

$$X(Y)_n Si(R)_{3-m}(Z)_m \qquad (1)$$

wherein X is a polymerizable unsaturated group; Y is a divalent bond group; R is a hydrogen atom, a lower alkyl group, an aryl group or an alkoxy group, and a plurality of R's may be the same as or different from one another; Z is a monovalent group of a siloxane polymer having a number-average molecular weight of at least about 500, not being inherently reactive under the polymerization conditions, forming a branched group from the main chain of the vinyl polymer; n is 0 or 1; and m is an integer of 1 to 3.

The present invention further provides an aqueous ink product for inkjet printing which comprises an aqueous dispersion (A) of a vinyl polymer obtained by copolymerizing a styrene macromer (b) of a styrene homopolymer or a styrene copolymer having a polymerizable functional group at one terminal end, a polymerizable unsaturated monomer (c) having a salt-forming group, and a monomer (d) capable of polymerizing with these monomers in the presence of a radical polymerization initiator (e), a hydrophobic dye (B) being contained in the particles of the aqueous dispersion (A).

In addition, the present invention provides a method for using the aqueous ink product as defined above for an inkjet recording and printing system.

DETAILED DESCRIPTION OF THE INVENTION

The aqueous ink for inkjet printing of the present invention contains a specific vinyl polymer aqueous dispersion in which a hydrophobic dye is contained in particles. That is to say, the hydrophobic dye is contained in the particles of the aqueous dispersion made of the vinyl polymer having such a specific structure as described above.

The vinyl polymer for use in the present invention is a polymer capable of forming micelles in which at least a part of the hydrophobic dye can be contained, and this vinyl polymer can be obtained by copolymerizing one or more selected from the group consisting of a silicone macromer having the above-mentioned formula (1), an acrylamide monomer and a methacrylamide monomer (except for a monomer having a salt-forming group), a polymerizable unsaturated monomer having the salt-forming group and a monomer capable of polymerizing with these monomers in the presence of a radical polymerization initiator.

In addition, the vinyl polymer for use in the present invention is a polymer capable of forming micelles in which at least a part of the hydrophobic dye can be contained, and this vinyl polymer can be obtained by copolymerizing a styrene macromer of a styrene homopolymer or a styrene copolymer having a polymerizable functional group at one terminal end, a polymerizable unsaturated monomer having a salt-forming group, and a monomer capable of polymerizing with these monomers in the presence of a radical polymerization initiator.

Furthermore, the vinyl polymer aqueous dispersion containing the hydrophobic dye can preferably be obtained by dissolving the thus obtained vinyl polymer together with the hydrophobic dye in an organic solvent, adding a neutralizer if necessary to ionize the salt-forming group in the polymer, adding water and then distilling off the organic solvent to be converted to the aqueous phase.

In the silicone macromer having the above-mentioned formula (1) used in the present invention, X is a polymerizable unsaturated group, and its specific examples include groups such as $CH_2=CH-$ and $CH_2=C(CH_3)-$. Y is a divalent bond group, and its specific examples include $-COO-$, $-COOC_bH_{2b}-$ (wherein b is a number of 1 to 5) and a phenylene group, preferably $-COOC_3H_6-$. R is a hydrogen atom; a lower alkyl group such as a methyl group or an ethyl group; an aryl group such as a phenyl group; and an alkoxy group such as a methoxy group; preferably a methyl group. Z is a monovalent siloxane polymer moiety having a number-average molecular weight of at least about 500, preferably dimethylsiloxane polymer having a number-average molecular weight of 800 to 5,000. n is 0 or 1, preferably 1. m is an integer of 1 to 3, preferably 1.

Examples of these silicone macromers include compounds represented by the formulae (1-1) to (1-4).

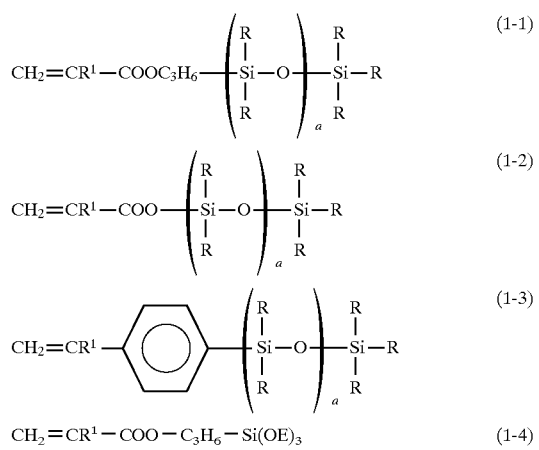

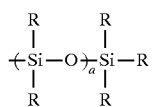

wherein a is a number of 5 to 65.

Above all, the compound represented by the formula (1-1) is preferable, and a silicone macromer FM-0711 (trademark, mfd. by Chisso Corp.) having a structure represented by the formula (1-1) is preferable:

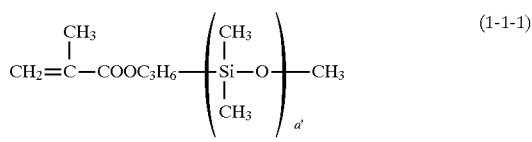

wherein a' is a number such that the weight-average molecular weight is 1,000.

Examples of the acrylamide monomer and the methacrylamide monomer not having any salt-forming group (hereinafter "(meth)acrylamide monomer") which can be used in the present invention include, but are not limited to acrylamide monomers such as acrylamide, N-(1,1-dimethyl-3-oxobutyl) acrylamide (diacetone acrylamide), N,N-dimethyl acrylamide, N,N-diethyl acrylamide, N,N-diisopropyl acrylamide, N,N-dibutyl acrylamide, N,N-diphenyl acrylamide, N-t-butyl acrylamide, N-t-hexyl acrylamide, N-t-octyl acrylamide, N-(1-methylundecyl) acrylamide, N-isobornyl acrylamide, N-norbornyl acrylamide, N-adamantyl acrylamide, N-benzyl acrylamide, N-(4-methylphenyl)methyl acrylamide, N-diphenyl acrylamide, phthalimidemethyl acrylamide, acrylamidehydroxyacetic acid, 3-acrylamide-3-methylbutyric acid, 10-acrylamideundecylic acid, N-(2,2,2-trichloro-1-hydroxy)ethyl acrylamide, N-1,1,3,5-tetramethyl)octyl acrylamide, N-(1,5-dimethyl-1-ethyl)hexyl acrylamide, N-i-propyl acrylamide, N-methylol acrylamide, N-cyclohexyl acrylamide and N-(1,1,3-trimethyl)butyl acrylamide, and methacrylamide monomers such as methacrylamide, N-(1,1-dimethyl-3-oxobutyl) methacrylamide, N,N-dimethyl methacrylamide, N,N-diethyl methacrylamide, N,N-diisopropyl methacrylamide, N,N-dibutyl methacrylamide, N,N-diphenyl methacrylamide, N-t-butyl methacrylamide, N-t-hexyl methacrylamide, N-t-octyl methacrylamide, N-(1-methylundecyl) methacrylamide, N-isobornyl methacrylamide, N-norbornyl methacrylamide, N-adamantyl methacrylamide, N-benzyl methacrylamide, N-(4-methylphenyl)methyl methacrylamide, N-diphenyl methacrylamide, phthalimidemethyl methacrylamide, N-(2,2,2-trichloro-1-hydroxy)ethyl methacrylamide, N-1,1,3,5-tetramethyl)octyl methacrylamide, N-(1,5-dimethyl-1-ethyl)hexyl methacrylamide, N-i-propyl methacrylamide, N-methylol methacrylamide, N-cyclohexyl methacrylamide and N-(1,1,3-trimethyl)butyl methacrylamide.

The styrene macromer used in the present invention is a styrene homopolymer or a styrene copolymer having a polymerizable functional group at one terminal end, and its weight-average monomer weight is preferably in the range of 1,000 to 10,000, more preferably 4,000 to 7,000. When the molecular weight is less than 1,000, the dye introduction ratio is not sufficient, and when it is more than 10,000, scorching is noticeable. Particularly preferably, the styrene macromer has an acryloyloxy group or a methacryloyloxy group as a polymerizable functional group at one terminal end. Furthermore, the ratio between a styrene unit and a copolymerizable monomer unit constituting the styrene macromer is such that the styrene unit in all the constitutional monomers is 60% by weight or more, preferably 70% by weight or more, because a sufficient dye introduction ratio is assured. Examples of the monomer capable of copolymerizing with styrene constituting the styrene copolymer include, but are not limited to acrylonitrile and the like.

Specific examples of the styrene macromer include compounds having a structure represented by the formula (2):

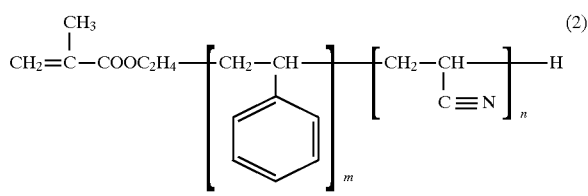

wherein the values of m and n are such that m/n=6/4 to 10/0, and are such that the weight-average molecular weight is in the range of 1,000 to 10,000.

Moreover, examples of the polymerizable unsaturated monomer having the salt-forming group for use in the present invention include cationic monomers such as unsaturated tertiary amine-containing monomers and unsaturated ammonium salt-containing monomers. Specific examples of the polymerizable unsaturated monomer having the salt-forming group include monovinylpyridines such as vinylpyridine, 2-methyl-5-vinylpyridine and 2-ethyl-5-vinylpyridine; styrenes having a dialkylamino group such as N,N-dimethylaminostyrene and N,N-dimethylaminomethylstyrene; esters having a dialkylamino group of acrylic acid and methacrylic acid such as N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-diethylaminopropyl acrylate and N,N-diethylaminopropyl methacrylate; vinyl ethers having a dialkylamino group such as 2-dimethylaminoethyl vinyl ether; acrylamides and methacrylamides having a dialkylamino group such as N-(N',N'-dimethylaminoethyl) acrylamide, N-(N',N'-dimethylaminoethyl) methacrylamide, N-(N',N'-diethylaminoethyl) acrylamide, N-(N',N'-diethylaminoethyl) methacrylamide, N-(N',N'-dimethylaminopropyl) acrylamide, N-(N',N'-dimethylaminopropyl) methacrylamide, N-(N',N'-diethylaminopropyl) acrylamide and N-(N',N'-diethylaminopropyl) methacrylamide; and quaternary compounds obtained by these compounds with a known quaternary compound forming agent such as an alkyl halide (in which an alkyl group has 1 to 18 carbon atoms and a halogen is chlorine, bromine or iodine), a benzyl halide such as benzyl chloride or benzyl bromide, an alkyl ester (in which an alkyl group has 1 to 18 carbon atoms) of an alkylsulfonic acid or an arylsulfonic acid such as methanesulfonic acid, benzenesulfonic acid or toluenesulfonic acid or dialkylsulfuric acid (in which an alkyl group has 1 to 4 carbon atoms). Furthermore, examples of the anionic monomer include unsaturated carboxylic acid monomers, unsaturated sulfonic acid monomers, unsaturated phosphoric acid monomers. Specific examples of the unsaturated carboxylic acid monomers include acrylic acid, methacrylic acid, crotonic acid, itaconic acid, maleic acid, fumaric acid, citraconic acid, 2-methacryloyloxymethylsuccinic acid, and anhydrides and salts thereof. Examples of the unsaturated sulfonic acid monomers include styrenesulfonic acid, 2-acrylamide-2-methylpropanesulfonic acid, 3-sulfopropyl (meth)acrylic acid ester, bis(3-sulfopropyl)itaconic acid ester, their salts, and sulfuric acid monoesters of 2-hydroxyethyl(meth)acrylic acid and their salts. Examples of the unsaturated phosphoric acid monomers include vinylphosphonic acid, vinyl phosphate, bis(methacryloxyethyl) phosphate, diphenyl-2-acryloyloxyethyl phosphate, diphenyl-2-methacryloyloxyethyl phosphate, dibutyl-2-acryloyloxyethyl phosphate, dibutyl-2-methacryloyloxyethyl phosphate and dioctyl-2(meth)acryloyloxyethyl phosphate.

Examples of the monomer capable of copolymerizing with the above-mentioned monomers which can be used in the present invention include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate and dodecyl acrylate; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, n-octyl methacrylate, decyl methacrylate and dodecyl methacrylate; styrenic monomers such as styrene, vinyltoluene, 2-methylstyrene and chlorostyrene; and hydroxyl group-containing acrylates and methacrylates such as 2-hydroxyethyl acrylate, 3-hydroxypropyl acrylate, polyethylene glycol acrylate, 2-hydroxyethyl methacrylate, 3-hydroxypropyl methacrylate and polyethylene glycol methacrylate.

In the present invention, when the above-mentioned vinyl polymer is produced, it is preferable to copolymerize one or more selected from the group consisting of a silicone macromer represented by the above-mentioned formula (1) and (meth)acrylamide monomers in an amount of 1 to 40%, preferably 10 to 30% by weight based on all the monomer components, the polymerizable unsaturated monomer having the salt-forming group in an amount of 3 to 40% by weight based on all the monomer components, and the other monomer component in an amount of 0 to 89% by weight based on all the monomer components.

Furthermore, in the present invention, when the above-mentioned vinyl polymer is manufactured, it is preferable to copolymerize the styrene macromer in an amount of 1 to 20% by weight, preferably 5 to 15% by weight based on all the monomer components, the polymerizable unsaturated monomer having the salt-forming group in an amount of 10 to 40% by weight, preferably 20 to 35% by weight based on all the monomer components, and the other monomer component in an amount of 40 to 89% by weight, preferably 50 to 75% by weight based on all the monomer components.

The vinyl polymer of the present invention can be produced by copolymerizing the above-mentioned monomers by a known polymerization method, e.g., bulk polymerization, solution polymerization, suspension polymerization, or emulsion polymerization, preferably solution polymerization.

As a solvent which can be used in solution polymerization, a polar organic solvent is preferable, and a water-compatible organic solvent may be mixed with water, when used. Examples of the organic solvent include aliphatic alcohols having 1 to 3 carbon atoms such as methanol, ethanol and propanol; ketones such as acetone and methyl ethyl ketone; and esters such as ethyl acetate. Above all, methanol, ethanol, acetone, methyl ethyl ketone and mixed solutions thereof are particularly preferable. These organic solvents can be used singly or in a combination of two or more.

In the above-mentioned polymerization, a radical polymerization initiator can be used, and suitable examples of the radical polymerization initiator include azo-compounds such as 2,2'-azobisisobutyronitrile, 2,2'-azobis(2,4-dimethylvaleronitrile), 2,2'-azobis(4-methoxy-2,4-dimethylvaleronitrile), dimethyl-2,2'-azobisbutylate, 2,2'-azobis(2-methylbutyronitrile) and 1,1'-azobis(1-cyclohexanecarbonitrile). In addition, organic peroxides such as t-butyl peroctoate, dicumyl peroxide, di-t-butyl peroxide and dibenzoyl oxide can also be used. The amount of the polymerization initiator to be used is in the range of 0.001 to 2.0 mol %, particularly preferably 0.01 to 1.0 mol %.

At the time of the above-mentioned polymerization, a polymerization chain transfer agent may be further added. Specific examples of the polymerization chain transfer agent to be used include mercaptans such as octylmercaptan, n-dodecylmercaptan, t-dodecylmercaptan, n-hexadecylmercaptan, n-tetradecylmercaptan and t-tetradecylmercaptan; xanthogen disulfides such as dimethylxanthogen disulfide, diethylxanthogen disulfide and diisopropylxanthogen disulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; unsaturated cyclic hydrocarbons such as acrolein, methacrolein, allyl alcohol, 2-ethylhexyl thioglycolate, terpinolene, $\alpha$-terpinene, $\gamma$-terpinene, dipentene, $\alpha$-methylstyrene dimers (a dimer containing 50 parts by weight or more of 2,4-diphenyl-4-methyl-1-pentene is preferable), 9,10-dihydroanthracene, 1,4-dihydronaphthalene, indene and 1,4-cyclohexadiene; and unsaturated heterocyclic compounds such as xantene and 2,5-dihydrofuran. They can be used singly or in a combination of two or more.

The polymerization is usually carried out at 30° to 100° C., preferably 50° to 80° C. for 1 to 10 hours, and these conditions can be suitably selected depending on the radical polymerization initiator, the monomers, the solvent and the like. In addition, the polymerization is preferably carried out under an inert gas atmosphere such as nitrogen.

After the polymerization, the produced copolymer can be isolated from the reaction solution by a conventional procedure of reprecipitation, the removal of the solvent by distillation and the like. Moreover, the obtained copolymer can be purified by the repetition of the reprecipitation, membrane separation, chromatography, extraction or the like to remove the unreacted monomers and the like.

The thus obtained vinyl polymer of the present invention preferably has a weight-average molecular weight of 3,000 to 50,000, preferably 10,000 to 40,000 in view of scorching of the printer head, durability of the printed ink, and formability of a dispersion.

In the present invention, no particular restriction is put on the hydrophobic dye. Any dye can be used, so long as it is compatible with the dispersion prepared from the vinyl polymer obtained in the above-mentioned manner. Examples of the hydrophobic dye include an oil dye, a disperse dye, a direct dye, an acid dye and a basic dye, but from the viewpoint of a good compatibility, the employment of the oil dye or the disperse dye is particularly preferable.

No particular restriction is put on the above-mentioned oil dye, but examples of the oil dye include C.I. Solvent Black 3, 7, 27, 29, 34; C.I. Solvent Yellow 14, 16, 29, 56, 82; C.I. Solvent Red 1, 3, 8, 18, 24, 27, 43, 51, 72, 73; C.I. Solvent Violet 3; C.I. Solvent Blue 2, 11, 70; C.I. Solvent Green 3, 7; C.I. Solvent Orange 2; C.I. Solvent Yellow 30, 93, 162; C.I. Solvent Red 49, 109, 122, 218; and C.I. Solvent Blue 25, 35.

Furthermore, no particular restriction is put on the above-mentioned disperse dye, preferable examples of the disperse dye include C.I. Disperse Yellow 5, 42, 54, 64, 79, 82, 83, 93, 99, 100, 119, 122, 124, 126, 160, 184:1, 186, 189, 198, 199, 204, 224, 237; C.I. Disperse Orange 13, 29, 31:1, 33, 49, 54, 55, 66, 73, 118, 119, 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; and C.I. Disperse Green 6:1, 9.

The hydrophobic dye used in the present invention is preferably dissolved in as much as 2 g/liter or more, more preferably as much as 20 to 500 g/liter of the organic solvent from the viewpoint of its efficient introduction into the above-mentioned vinyl polymer by phase reversal emulsification (described hereinafter).

The vinyl polymer aqueous dispersion containing the dye for use in the aqueous ink for inkjet printing of the present invention can preferably be prepared by phase reversal emulsification.

That is to say, the vinyl polymer aqueous dispersion can be obtained by dissolving the vinyl polymer, obtained by the polymerization, together with the hydrophobic dye in an organic solvent, adding a neutralizer if necessary to ionize the salt-forming group in the polymer, adding water, and then distilling off the organic solvent to be converted to the aqueous phase.

Phase reversal emulsification will now be described in detail.

First, the vinyl polymer and the hydrophobic dye are dissolved in the organic solvent. In this case, it is preferable from the viewpoint of obtaining a stable aqueous dispersion to dissolve 5 to 50, preferably 15 to 40 parts by weight of the vinyl polymer and 0.1 to 50, preferably 5 to 45 parts by weight of the hydrophobic dye in 100 parts by weight of the organic solvent.

As the organic solvent which can be used here, a hydrophilic organic solvent is preferable, and specific examples of the hydrophilic organic solvent include solvents such as alcohols, ketones and ethers. Examples of the alcoholic solvents include methanol, ethanol, n-propanol, isopropanol, n-butanol, secondary butanol, tertiary butanol, isobutanol and diacetone alcohol. Examples of the ketone solvents include acetone, methyl ethyl ketone, diethyl ketone, dipropyl ketone, methyl isobutyl ketone and methyl isopropyl ketone. Examples of the ether solvents include diethyl ether, dibutyl ether, tetrahydrofuran and dioxane. Among these compounds, isopropanol, acetone and methyl ethyl ketone are preferable. These hydrophilic organic solvents can be used singly or as a mixture of two or more, and if necessary, a high-boiling hydrophilic organic solvent may be used together therewith. Examples of the high-boiling hydrophilic organic solvent include phenoxyethanol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol diethyl ether and 3-methyl-3-butoxybutanol.

Next, if necessary, a neutralizer can be added to the organic solvent solution of the vinyl polymer and the hydrophobic dye to ionize a salt-forming group in the vinyl polymer. As the neutralizer, a known acid or base may be used depending on the kind of salt-forming group. Examples of the acid include inorganic acids such as hydrochloric acid and sulfuric acid as well as organic acids such as acetic acid, propionic acid, lactic acid, succinic acid and glycolic acid. Furthermore, examples of the base include, but are not limited to tertiary amines such as trimethylamine and triethylamine, and ammonia, sodium hydroxide and potassium hydroxide. No particular restriction is put on the degree of the neutralization, but it is preferable to carry out the neutralization so that the obtained aqueous dispersion of the self-dispersing type polymer particles may be in the range of from a weak acidic state to a neutral state.

After the addition of the neutralizer, water (ion-exchanged water) is added to the organic solvent, and the system is heated under reduced pressure to distill off the organic solvent and simultaneously a predetermined amount of water, thereby obtaining a vinyl polymer dispersion having a predetermined solid concentration according to the present invention. The amount of water to be added is preferably in the range of 100 to 300 parts by weight based on 100 parts by weight of the organic solvent to which the neutralizer has been added. In this case, a usual dispersant may be added to the above-mentioned organic solvent.

The particle diameter of the thus obtained aqueous dispersion of the vinyl polymer containing the hydrophobic dye is preferably in the range of 0.01 to 0.50 μm. If the particle diameter is less than 0.01 μm, the feathering of ink takes place, and if it is more than 0.50 μm, the stability of the dispersion might be impaired. Thus, the particle diameter is preferably within the above-mentioned range. More preferably, the particle diameter is in the range of 0.02 to 0.15 μm.

In the aqueous ink for inkjet printing of the present invention, the polymer content of the vinyl polymer aqueous dispersion containing the above-mentioned hydrophobic dye is preferably in the range of 1 to 50% by weight, more preferably, 2 to 30% by weight in terms of a solid content. If the amount of the blended vinyl polymer is less than 1% by weight, print density is insufficient, and if it is more than 50% by weight, the dispersion stability of the ink deteriorates or the ink vaporizes at the tip of a nozzle, so that the viscosity of the solution increases and the particles cohere, which leads to clogging of a head on occasion. Therefore, the amount of the vinyl polymer is preferably within the above-mentioned range.

On the other hand, the amount of the hydrophobic dye which is to be blended with the aqueous ink of the present invention is preferably in the range of 1 to 10% by weight, more preferably 1.5 to 5% by weight. If the amount of the hydrophobic dye is less than 1% by weight, print density is insufficient, and if it is more than 10% by weight, the dispersion stability of the aqueous dispersion deteriorates with time, and so there is a tendency for particle diameter to increase. Therefore, the amount of the hydrophobic dye is preferably within the above-mentioned range.

The aqueous ink for inkjet printing of the present invention comprises the above-mentioned specific vinyl polymer dispersion in which water is used as the medium and the hydrophobic dye is contained, but preferably, various conventional known additives are added to the dispersion. Examples of the additives include a wetting agent such as a polyhydric alcohol, a dispersant, a defoaming agent, a fungistat, and/or a chelating agent.

Examples of the wetting agent include polyhydric alcohols such as ethylene glycol, propylene glycol, diethylene glycol, triethylene glycol, polyethylene glycol, glycerol, diethylene glycol diethyl ether and diethylene glycol mono-n-butyl ether, their ethers and acetates, and nitrogen-containing compounds such as N-methyl-2-pyrrolidone and 1,3-dimethylimidazolidinone, and they can be used singly or as a mixture of two or more thereof. No particular restriction is put on the amount of the wetting agent to be blended, but the amount of the wetting agent to be blended with the ink is preferably in the range of 0.1 to 50% by weight, more preferably 0.1 to 30% by weight.

Furthermore, no particular restriction is put on the dispersant. Anionic, nonionic and cationic dispersants can be used, so long as the stability of the vinyl polymer dispersion is not impaired.

In addition, no particular restriction is put on the defoaming agent. It is particularly preferable to use a compound represented by the formula (3), because the employment of this compound permits inhibiting the formation of the foam at the time of ink preparation, and regulating the surface tension of the ink.

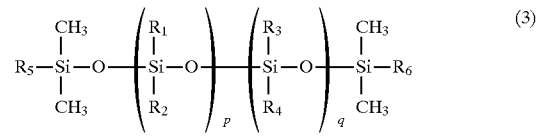

wherein $R_1$, $R_2$, $R_3$ and $R_4$ are the same as or different from one another, and each is an alkyl group having 1 to 10 carbon atoms or a phenyl group which may have a substituent; $R_5$ and $R_6$ are the same or different, and each is an alkyl group having 1 to 10 carbon atoms, a phenyl group which may have a substituent, a hydroxyl group, an amino group, a carboxyl group, or an epoxy group; and p and q are the same or different, and each is an integer of 0 to 1,000, preferably 10 to 100.

Examples of the compound represented by the above-mentioned formula (3) include KF 96, 66, 69, KS 68, 604, 607A, 602, 603, KM 73, 73A, 73E, 72, 72A, 72C, 72F, 82F, 70, 71, 75, 80, 83A, 85, 89, 90, 68-1F, 68-2F (trademark) which are manufactured by Shin-Etsu Silicone Co., Ltd.

No restriction is put on the amount of the defoaming agent to be blended, but the amount of the defoaming agent to be blended with the aqueous ink for inkjet recording of the present invention is preferably in the range of 0.0001 to 2.0% by weight, more preferably 0.005 to 0.5% by weight. If the amount of the defoaming agent to be blended is less than 0.001% by weight, foam is apt to be generated during the preparation of the ink, and it is difficult to remove small bubbles from the ink. If it is more than 2.0% by weight, generation of foam can be suppressed, but cissing (runaway or crawling) occurs in the ink, so that printing quality deteriorates. Thus, the amount of the defoaming agent to be blended is preferably within the above-mentioned range.

The thus obtained aqueous ink for inkjet printing of the present invention has excellent water resistance and can prevent scorching of ink onto a printer head.

Furthermore, the aqueous ink for inkjet printing of the present invention can contain greater amounts of hydrophobic dye.

Other features of the invention will become apparent in the course of the following descriptions of exemplary embodiments which are given for illustration of the invention and are not intended to be limiting thereof.

EXAMPLES

Part(s) and percent in the examples are based on weight, unless otherwise specified.

Preparation Examples 1-1 to 1-4, and 2-1 and 2-2

20 parts of methyl ethyl ketone as a polymerization solvent, monomers as polymerizable unsaturated monomers described in the column Initial Feed Monomer in Tables 1-1 and 2-1, and a polymerization chain transfer agent were placed in a reaction vessel equipped with a stirrer, a reflux condenser, a dropping funnel, a thermometer and a nitrogen feed pipe, and purging was then sufficiently carried out with nitrogen gas. Monomers described in the column Dropping Monomer in Tables 1-1 and 2-1, another polymerization chain transfer agent, 60 parts of methyl ethyl ketone and 0.2 part of 2,2'-azobis(2,4-dimethylvaleronitrile) were fed after the sufficient purging with nitrogen.

Under a nitrogen atmosphere, the mixed solution in the reaction vessel was heated up to 65° C. with stirring, and the mixed solution in the dropping funnel was slowly added dropwise over 3 hours. Two hours after the completion of the dropwise addition, a solution obtained by dissolving 0.1 part of 2,2'-azobis(2,4-dimethylvaleronitrile) in 5 parts of methyl ethyl ketone was added, and aging was then carried out at 65° C. for 2 hours and at 70° C. for 2 hours to obtain a copolymer solution.

A part of the thus obtained copolymer solution was dried at 105° C. for 2 hours under reduced pressure to completely remove the used solvent, thereby isolating the copolymer. The molecular weight of the copolymer was measured by gel permeation chromatography using polystyrene as a control substance and tetrahydrofuran as a solvent, and as a result, it was about 10,000 as weight-average molecular weight.

Next, 1,000 parts of acetone and 33.4 parts of a hydrophobic dye shown in Table 1-1 were added to the copolymer solution obtained above, and were then completely dissolved. Afterward, 98 parts of a 30% aqueous solution of a base shown in Table 1-1 was added with stirring to partially neutralize a salt-forming group in the copolymer, and 1,500 parts of ion-exchanged water was then added. Next, methyl ethyl ketone and acetone were completely removed at 60° C. under reduced pressure, and water was partially removed to concentrate the solution, thereby obtaining a vinyl polymer aqueous dispersion containing the hydrophobic dye in which the solids content was 13% by weight.

To the copolymer solution obtained above, 1,000 parts of acetone and 33.4 parts of a hydrophobic dye shown in Table 2-1 were added, and were then completely dissolved. Afterward, 98 parts of a 30% aqueous solution of a base shown in Table 2-1 was added with stirring to partially neutralize a salt-forming group in the copolymer, and 1,500 parts of ion-exchanged water was then added. Next, methyl ethyl ketone and acetone were completely removed at 60° C. under reduced pressure, and water was partially removed to concentrate the solution, thereby obtaining a vinyl polymer aqueous dispersion containing the hydrophobic dye in which the solids content was 10% by weight.

TABLE 1-1

| Preparation Example 1-1 | Preparation Example 1-2 | Preparation Example 1-3 | Preparation Example 1-4 |
|---|---|---|---|
| Initial Feed Monomer and Polymerization Chain Transfer Agent | | | |
| Lauryl acrylate 4 parts | Benzyl methacrylate 6 parts | n-Butyl methacrylate 10 parts | t-Butyl methacrylate 10 parts |
| Hydroxyethyl methacrylate 2 parts | Polyethylene glycol methacrylate 2 parts | Hydroxydiethyl methacrylate 2 parts | Polyethylene glycol methacrylate 2 parts |
| Dimethylaminopropyl acrylamide 7 parts | Methacrylic acid 5 parts | Dimethylaminoethyl acrylamide 7 parts | Acrylic acid 5 parts |
| Diacetone acrylamide 7 parts | t-Octyl acrylamide 7 parts | Silicone macromer-FM-0711* (mfd. by Chisso Corp.) 1 part | Silicone macromer-FM-0711* (mfd. by Chisso Corp.) 1 part |
| n-Hexyl mercaptan 0.5 part | t-Dodecyl mercaptan 0.6 part | n-Tetradecyl mercaptan 0.6 part | n-Dodecyl mercaptan 0.6 part |
| Dropping Monomer and Polymerization Chain Transfer Agent | | | |
| Lauryl acrylate 16 parts | Benzyl methacrylate 24 parts | n-Butyl methacrylate 40 parts | t-Butyl methacrylate 48 parts |
| Hydroxyethyl methacrylate 8 parts | Polyethylene glycol methacrylate 8 parts | Hydroxydiethyl methacrylate 8 parts | Polyethylene glycol methacrylate 8 parts |
| Dimethylaminopropyl acrylamide 28 parts | Methacrylic acid 20 parts | Dimethylaminoethyl acrylamide 28 parts | Acrylic acid 20 parts |
| Diacetone acrylamide 28 parts | t-Octyl acrylamide 28 parts | Silicone macromer-FM-0711* (mfd. by Chisso Corp.) 4 parts | Silicone macromer-FM-0711* (mfd. by Chisso Corp.) 4 parts |
| n-Hexyl mercaptan 2.0 parts | t-Dodecyl mercaptan 2.4 parts | n-Tetradecyl mercaptan 2.4 parts | n-Dodecyl mercaptan 2.4 parts |
| Base for Neutralization | | | |
| Glycolic acid | NaOH | Succinic acid | Aqueous ammonia |
| Dye | | | |
| Varifarst Blue 2606* (mfd. by Orient Co., Ltd.) | Spilon Red C-BR* (mfd. by Hodogaya Chemical Co., Ltd.) | Oil Black 860* (mfd. by Orient Co., Ltd.) | Spilon Yellow C-GNH. New* (mfd. by Hodogaya Chemical Co., Ltd.) |

Note)
*trademark

TABLE 2-1

| Preparation Example 2-1 | Preparation Example 2-2 |
|---|---|
| Initial Feed Monomer and Polymerization Chain Transfer Agent ||
| n-Butyl methacrylate<br>10 parts | t-Butyl methacrylate<br>12 parts |
| Hydroxyethyl methacrylate<br>2 parts | Polyethylene glycol methacrylate<br>2 parts |
| Methacrylic acid<br>7 parts | Acrylic acid<br>5 parts |
| Styrene macromer A*[1]<br>1 part | Styrene macromer B*[2]<br>1 part |
| n-Tetradecyl mercaptan<br>0.6 part | n-Dodecyl mercaptan<br>0.6 part |
| Dropping Monomer and Polymerization Chain Transfer Agent ||
| n-Butyl methacrylate<br>40 parts | t-Butyl methacrylate<br>48 parts |
| Hydroxyethyl methacrylate<br>8 parts | Polyethylene glycol methacrylate<br>8 parts |
| Methacrylic acid<br>28 parts | Acrylic acid<br>20 parts |
| Styrene macromer A*[1]<br>4 parts | Styrene macromer B*[2]<br>4 parts |
| n-Tetradecyl mercaptan<br>2.4 parts | n-Dodecyl mercaptan<br>2.4 parts |
| Base for Neutralization ||
| Ammonia | Diethanolamine |
| Dye ||
| Spilon Red C-BR*<br>(mfd. by Hodogaya Chemical<br>Co., Ltd.) | Spilon Yellow C-GNH. New*<br>(mfd. by Hodogaya Chemical<br>Co., Ltd.) |

Notes:
*trademark
*[1]Styrene macromer A: Manufactured by Toagosei Chemical Industry Co., Ltd.; Trade name AN-6 (styrene/acrylonitrile copolymerized macromer, styrene content = 70 wt %, weight-average molecular weight = 6,000)
*[2]Styrene macromer B: Manufactured by Toagosei Chemical Industry Co., Ltd.; Trade name AS-6 (styrene homopolymerized macromer, weight-average molecular weight = 6,000)

Preparation Examples 5 and 6

The same procedure as in Preparation Example 1-1 was repeated except that compositions shown in Table 3 were used, thereby obtaining products of Preparation Examples 5 and 6.

TABLE 3

| Preparation Example 5 | Preparation Example 6 |
|---|---|
| Initial Feed Monomer and Polymerization Chain Transfer ||
| t-Butyl Methacrylate<br>11 parts | t-Butyl methacrylate<br>7 parts |
| Polyethylene glycol methacrylate<br>3 parts | t-Butyl acrylamide<br>6 parts |
| — | Polyethylene glycol methacrylate<br>3 parts |
| Acrylic acid<br>3 parts | Acrylic acid<br>1 part |
| Styrene/acrylonitrile copolymer<br>macromer AN-6*<br>(mfd. by Toagosei Chemical<br>Industry Co., Ltd.)<br>1 part | Styrene/acrylonitrile copolymer<br>macromer AN-6*<br>(mfd. by Toagosei Chemical<br>Industry Co., Ltd)<br>1 part |
| Silicone macromer<br>2 parts | Silicone macromer<br>2 parts |
| n-Dodecyl mercaptan<br>0.6 part | n-Dodecyl mercaptan<br>0.6 part |

TABLE 3-continued

| Preparation Example 5 | Preparation Example 6 |
|---|---|
| Dropping Monomer and Polymerization Chain Transfer Agent ||
| t-Butyl methacrylate<br>44 parts | t-Butyl methacrylate<br>28 parts |
| — | t-Butyl acrylamide<br>24 parts |
| Polyethylene glycol methacrylate<br>12 parts | Polyethylene glycol methacrylate<br>12 parts |
| Acrylic acid<br>12 parts | Acrylic acid<br>4 parts |
| Styrene/acrylonitrile copolymer<br>macromer AN-6*<br>(mfd. by Toagosei Chemical<br>Industry Co., Ltd.)<br>4 parts | Styrene/acrylonitrile copolymer<br>macromer AN-6*<br>(mfd. by Toagosei Chemical<br>Industry Co., Ltd.)<br>4 parts |
| Silicone macromer-FM-0711*<br>8 parts | Silicone macromer-FM-0711*<br>8 parts |
| n-Dodecyl mercaptan<br>2.4 parts | n-Dodecyl mercaptan<br>2.4 parts |
| Base for Neutralization ||
| Aqueous ammonia | Aqueous ammonia |
| Dye ||
| Oil Yellow 129*<br>(mfd. by Orient Co., Ltd.) | Neopen Mazenta SE1378*<br>(mfd. by BASF) |

Note)
*trademark

Examples 1-1 to 1-4 and 5 to 6

80 parts of the vinyl polymer dispersion obtained in each of Preparation Examples 1-1 to 1-4, 10 parts of ion-exchanged water and 0.1 part of a defoaming agent (Shin-Etsu Silicone Co., Ltd., KM-71) were mixed, and the resulting dispersion was filtered through a filter of 0.2 μm to remove dust and coarse particles therefrom, thereby obtaining an aqueous ink.

For the thus obtained inks, physical properties were evaluated in accordance with the following procedures. The results are shown in Table 1-2.

<Evaluation Procedures>

(1) Print Density

Allover print was carried out on a recycled paper for PPC (Nippon Kako Seishi Co., Ltd.) by the use of a commercially available microbubble jet printer (model BJ-10VL, Canon Inc.), and it was then spontaneously dried at room temperature for 24 hours. Afterward, optical density was measured by a Macbeth densitometer RD918 (Macbeth Co., Ltd.).

(2) Feathering

By the use of the above-mentioned printer, the letters of alphabets and numerals were printed on the recycled paper for PPC (Nippon Kako Seishi Co., Ltd.), and after they were allowed to stand for 1 hour or more, the sharpness of the letters and the moustache-like feathering degree of the letters were evaluated by a microscope and the naked eye on the basis of the following classification.

◯: The letters were sharp, and moustache-like feathering was not observed.

Δ: The sharpness of the letters was poor, and feathering also occurred.

X: The sharpness of the letters was not observed, and feathering was also noticeable.

(3) Water Resistance

By the use of the above-mentioned printer, allover print was carried out on the recycled paper for PPC (Nippon Kako Seishi Co., Ltd.), and it was then dried for a period of 1 hour or more. Afterward, it was vertically immersed into stationary water, and then pulled up as it was. After the paper was spontaneously dried at room temperature, the print density of the same letters was measured by the use of the above-mentioned Macbeth densitometer, and the water resistance was determined by the following formula:

Water resistance (%)=print density after immersion/initial print density×100

(4) Scorching Resistance

By the use of the above-mentioned printer, allover print was carried out on five sheets of recycled A4 size paper for PPC (Nippon Kako Seishi Co., Ltd.), and a heating portion in an ink cartridge was then observed by a microscope. The degree of an ink scorching state was evaluated on the basis of the following classification.

◯: The adhesion of a scorch was not observed.

Δ: The adhesion of the scorch was slightly observed.

X: The adhesion of the scorch was noticeably observed.

Comparative Examples 1 and 2

As each comparative example, an ink was prepared in accordance with the following blend by the use of a water-soluble dye which had been used in a usual ink for inkjet printing. For the resulting ink, physical properties were evaluated in the same manner as in Examples 1-1 to 1-4 described above. The results are shown in Table 1-2.

<Ink of Comparative Example 1>

| | |
|---|---|
| C.I. Direct Yellow 132 | 1.5% |
| Diethylene glycol | 7.5% |
| Glycerol | 2.5% |
| Ion-exchanged water | 88.5% |

<Ink of Comparative Example 2>

| | |
|---|---|
| C.I. Acid Red 52 | 1.5% |
| Triethylene glycol | 10% |
| 1,2,6-Hexanetriol | 5% |
| Ion-exchanged water | 83.5% |

(Shin-Etsu Silicone Co., Ltd., KM-71 (trademark)) were mixed, and the resulting dispersion was then filtered through a filter of 0.2 μm in to remove dust and coarse particles therefrom, thereby obtaining an aqueous ink.

For the thus obtained inks, physical properties were evaluated in accordance with the following procedures. The results are shown in Table 2-2.

<Evaluation Procedures>

(1) Print Density

The same procedure as described above was used.

(2) Feathering

The same procedure as described above was used.

(3) Water Resistance

The same procedure as described above was used.

TABLE 2-2

| | Example 2-1 | Example 2-2 |
|---|---|---|
| Vinyl Polymer Aqueous Dispersion | Preparation Example 2-1 | Preparation Example 2-2 |
| Print Density | 1.27 | 1.26 |
| Feathering | ◯ | ◯ |
| Water Resistance | 98% | 100% |

This application is based on Japanese Patent Application Nos. 35081/96 and 48498/96, filed with the Japanese Patent Office on Feb. 22, 1996 and Mar. 6, 1996, respectively, the entire contents of which are incorporated herein by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An aqueous inkjet printing ink, comprising an aqueous dispersion (A) of particles of a vinyl polymer formed by copolymerizing:

at least one monomer (a) selected from the group consisting of:

a silicone macromer (a-1) having the formula (1), $$X(Y)_n Si(R)_{3-m}(Z)_m \quad (1)$$

TABLE 1-2

| | Example 1-1 | Example 1-2 | Example 1-3 | Example 1-4 | Comp. Ex. 1 | Comp. Ex. 2 | Example 5 | Example 6 | Comp. Ex. 1 | Comp. Ex. 2 |
|---|---|---|---|---|---|---|---|---|---|---|
| Vinyl Polymer Aqueous Dispersion | Preparation Example 1-1 | Preparation Example 1-2 | Preparation Example 1-3 | Preparation Example 1-4 | — | — | Preparation Example 5 | Preparation Example 6 | — | — |
| Print Density | 1.25 | 1.27 | 1.28 | 1.24 | 1.3 | 1.32 | 1.27 | 1.23 | 1.3 | 1.32 |
| Feathering | ◯ | ◯ | ◯ | ◯ | Δ | Δ to X | ◯ | ◯ | Δ | Δ to X |
| Water Resistance | 99% | 98% | 98% | 100% | 75% | 72% | 99% | 97% | 75% | 72% |
| Scorching Resistance | ◯ | ◯ | ◯ | ◯ | Δ | Δ | ◯ | ◯ | Δ | Δ |

Examples 2-1 and 2-2

80 parts of the vinyl polymer dispersion obtained in each of Preparation Examples 2-1 and 2-2, 10 parts of diethylene glycol, 10 parts of glycerol and 0.1 part of a defoaming agent wherein X is a polymerizable unsaturated group; Y is a divalent bond group; R is a hydrogen atom, a lower alkyl group, an aryl group or an alkoxy group, and a plurality of R's may be the same as or different from one another; Z is a monovalent group of a siloxane polymer having a number-average molecular weight of at least about 500; n is 0 or 1; and m is an integer of 1 to 3;

an acrylamide monomer (a-2), and a methacrylamide monomer (a-3) not having a salt-forming group, a polymerizable unsaturated monomer (c) having a salt-forming group, and a monomer (d) capable of polymerizing with these monomers in the presence of a radical polymerization initiator (e), wherein a hydrophobic dye (B) is contained in the particles of the aqueous dispersion (A).

2. The aqueous ink-jet printing ink of claim 1, wherein the monomer (a) is a silicone macromer of the formula (1-1):

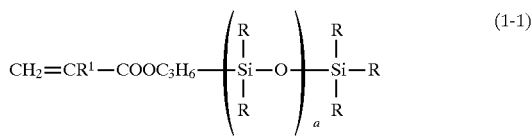

wherein R' is a hydrogen atom or a methyl group; R is as defined above, and 2a+3 R's may be the same as or different from one another; and a is a number of 5 to 65.

3. The aqueous inkjet printing ink of claim 1, wherein the number-average molecular weight of the vinyl polymer is in the range of 3,000 to 50,000.

4. The aqueous inkjet printing ink of claim 1, which is produced by the steps of:

copolymerizing at least one monomer (a) selected from the group consisting of a silicone macromer having the formula (1), an acrylamide monomer and a methacrylamide monomer not having a salt-forming group; a polymerizable unsaturated monomer (c) having a salt-forming group; and a monomer (d) capable of polymerizing with these monomers in the presence of a radical polymerization initiator (e), to obtain a vinyl polymer, dissolving the vinyl polymer together with a hydrophobic dye (B) in an organic solvent, adding a neutralization agent if necessary to ionize the salt-forming group in the polymer, adding water and then distilling off the organic solvent to be converted to the aqueous phase and to prepare an aqueous dispersion (A) of the vinyl polymer containing the hydrophobic dye (B).

5. An aqueous inkjet printing ink which comprises an aqueous dispersion (A) of particles of a vinyl polymer obtained by copolymerizing:

a styrene macromer (b) of a styrene homopolymer or a styrene copolymer having a polymerizable functional group at one terminal end, a polymerizable unsaturated monomer (c) having a salt-forming group, and a monomer (d) capable of polymerizing with these monomers in the presence of a radical polymerization initiator (e), wherein a hydrophobic dye (B) is contained in the particles of the aqueous dispersion (A).

6. The aqueous inkjet printing ink of claim 5, wherein the weight-average molecular weight of the styrene macromer is in the range of 1,000 to 10,000.

7. The aqueous inkjet printing ink of claim 5, wherein the styrene macromer is a styrene polymer or copolymer having an acryloyloxy group or a methacryloyloxy group at one terminal end and including at least 60 percent by weight of styrene based on the total monomer units, the balance being of other monomer(s).

8. The aqueous inkjet printing ink of claim 5, wherein the weight-average molecular weight of the vinyl polymer is in the range of 3,000 to 50,000.

9. The aqueous ink-jet printing ink of claim 5, which is produced by the steps of:

copolymerizing a styrene macromer (b) of a styrene homopolymer or a styrene copolymer having a polymerizable functional group at one terminal end, a polymerizable unsaturated monomer (c) having a salt-forming group, and a monomer (d) capable of polymerizing with these monomers in the presence of a radical polymerization initiator (e) to obtain a vinyl polymer, dissolving the vinyl polymer together with a hydrophobic dye (B) in an organic solvent, adding a neutralization agent if necessary to ionize the salt-forming group in the polymer, adding water and then distilling off the organic solvent to be converted to the aqueous phase and to prepare an aqueous dispersion (A) of the vinyl polymer containing the hydrophobic dye (B).

10. A method for inkjet recording and printing comprising the step of jetting the aqueous inkjet printing ink of claim 1 through fine nozzles onto a printing material.

11. The aqueous inkjet printing ink of claim 5, wherein the styrene macromer comprises 70% by weight of styrene based on the total monomer units.

* * * * *